United States Patent
Menzel

(10) Patent No.: US 8,702,846 B2
(45) Date of Patent: Apr. 22, 2014

(54) PROCESS FOR REMOVING ACID GASES FROM A GAS STREAM

(75) Inventor: Johannes Menzel, Waltrop (DE)

(73) Assignee: Thyssenkrupp UHDE GmbH, Dortmund (DE)

( * ) Notice: Subject to any disclaimer, the term of this patent is extended or adjusted under 35 U.S.C. 154(b) by 23 days.

(21) Appl. No.: 12/994,859

(22) PCT Filed: Jun. 26, 2009

(86) PCT No.: PCT/EP2009/004609
§ 371 (c)(1),
(2), (4) Date: Dec. 16, 2010

(87) PCT Pub. No.: WO2010/003558
PCT Pub. Date: Jan. 14, 2010

(65) Prior Publication Data
US 2011/0088554 A1    Apr. 21, 2011

(30) Foreign Application Priority Data
Jul. 7, 2008    (DE) .......................... 10 2008 031 552

(51) Int. Cl.
*B01D 53/14*    (2006.01)

(52) U.S. Cl.
USPC ........................................... 95/236; 423/228

(58) Field of Classification Search
USPC .......................................... 95/43–56, 90–266
See application file for complete search history.

(56) References Cited

U.S. PATENT DOCUMENTS

| | | | |
|---|---|---|---|
| 4,545,965 A * | 10/1985 | Gazzi et al. | 423/229 |
| 6,102,987 A * | 8/2000 | Gross et al. | 95/172 |
| 6,342,091 B1 | 1/2002 | Menzel | |
| 7,481,988 B2 | 1/2009 | Katz | |
| 2006/0104877 A1* | 5/2006 | Cadours et al. | 423/226 |
| 2006/0178259 A1* | 8/2006 | Schubert et al. | 502/56 |
| 2006/0185512 A1 | 8/2006 | Schubert | |
| 2008/0236390 A1 | 10/2008 | Anders | |
| 2010/0300290 A1* | 12/2010 | Schubert et al. | 95/235 |

* cited by examiner

*Primary Examiner* — Duane Smith
*Assistant Examiner* — Joubert X Glover
(74) *Attorney, Agent, or Firm* — Jonathan Myers; Andrew Wilford

(57) ABSTRACT

A process is disclosed for removing acid gases from a gas stream, in particular from a natural gas stream, synthesis gas stream or the like, wherein the acid gases are absorbed from the gas stream by at least one absorbent. The absorbent used is a mixture of a physical scrubbing agent, a chemical scrubbing agent and water. The absorbent comprises more than 60% by weight of the physical scrubbing medium, wherein the physical scrubbing medium used is a morpholine derivative and a chemical scrubbing agent based on at least one aliphatic amine compound which includes a polyethylene glycol substituted amine.

9 Claims, No Drawings

PROCESS FOR REMOVING ACID GASES FROM A GAS STREAM

CROSS REFERENCE TO RELATED APPLICATIONS

This application is the US national phase of PCT application PCT/EP2009/004609, filed 26 Jun. 2009, published 14 Jan. 2010 as 2010/003558, and claiming the priority of German patent application 102008031552.4 itself filed 7 Jul. 2008, whose entire disclosures are herewith incorporated by reference.

FIELD OF THE INVENTION

The invention relates to a method of removing acid gases from a gas stream, in particular from a stream of natural gas, synthesis gas, or the like, where the acid gases from the gas stream are absorbed by at least one absorbent and a mixture of a physical scrubbing agent, a chemical scrubbing agent and water is used as the absorbent.

BACKGROUND OF THE INVENTION

Methods for removing acid gases from gas streams are known from practice. It has proven useful in a stripping column to extract the acid gases from a natural gas stream, for example by physically acting absorbing agents. In this manner most of the acid-gas components can be removed from the gas stream. However, it is a disadvantage in the methods known from practice that a required virtually complete removal of the acid gas components is possible only with a disproportionately high expenditure. This means in particular that a voluminous scrubbing liquid circulation and/or large packing heights are necessary in an absorber column or a stripper column. Furthermore, methods are known from practice in which scrubbing agents are used that contain a physically acting absorbing agent and a chemically acting scrubbing agent and water.

A method is known from DE 10 2005 050 385 [US 2008/0236390] for removing carbon dioxide from gas streams. A mixture of a primary or secondary amine in an aqueous solution, a physical solvent (for example, acetylmorpholine, N-formylmorpholine) and optionally further amines are used as an absorbing agent. The proportion of the morpholine in the absorbing agent is up to 25%.

It is a disadvantage of the known methods, in particular when high acid-gas partial pressures are present, that due to the proportion of the chemical scrubbing agent and water in the absorbent, the proportion of the physically acting absorbing agent has to be reduced, so that the capacity of the physically acting absorbing agent is reduced. It is furthermore disadvantageous that as a result of the water content in the absorbent, in particular with high acid gas partial pressures, increasing corrosion is to be expected in the devices in which the methods are carried out.

OBJECT OF THE INVENTION

In contrast, the object of the invention is to provide a method with which acid gas components can be removed from a gas stream simply and easily and with which the corrosion problems described above can be reliably avoided.

SUMMARY OF THE INVENTION

To attain this object, the invention teaches a method of removing acid gases from a gas stream, in particular from a stream of natural gas, synthesis gas, or the like of the type mentioned at the outset that is characterized in that the absorbent contains more than 70% by weight of the physical scrubbing agent and no more than 5% by weight water, that a morpholine derivative is used as a physical scrubbing agent and that a chemical scrubbing agent on the basis of at least one aliphatic amine compound is used. Within the scope of the invention, acid gases or acid-gas components means among other things carbon monoxide (CO), carbon dioxide ($CO_2$), hydrocyanic acid (HCN), hydrogen sulfide ($H_2S$), carbon disulfide ($CS_2$), carbon oxide sulfide (COS) and mercaptans. Advantageously, the gas stream containing acid gas is guided through an absorption column in which the liquid absorbent flows counter to the gas stream. An intimate mixing of the gas or of the gas stream and the absorbent is achieved by the opposite flow directions of the gas stream containing acid gas and the absorbent, so that the acid gas components are absorbed by the absorbent. Regeneration of the absorbent is advantageously carried out in a stripping column.

It is within the scope of the invention that the absorbent contains mainly at least one physical scrubbing agent. It is possible that the physical scrubbing agent is composed of one and preferably two morpholine derivatives. The physical scrubbing agent can also contain a plurality or a multiplicity of morpholine derivatives.

According to the method according to the invention, the chemical scrubbing agent contains at least one aliphatic amine compound. The absorption of acid gases, in particular of $H_2S$, up to the ppm range is achieved by the combination of the physical scrubbing agent and the chemical scrubbing agent. According to a preferred embodiment of the method according to the invention, the chemical scrubbing agent contains at least two amine compounds.

It is advisable that the absorbent contains more than 80% by weight of the physical scrubbing agent. In a preferred embodiment of the method according to the invention, the absorbent contains approximately 85% by weight to approximately 98% by weight and particularly preferably approximately 95% by weight of the physical scrubbing agent.

The aim is to achieve a lower water content of the absorbent. Preferably less than 3% by weight water is contained in the absorbent. It is within the scope of the invention that the absorbent has a water content of approximately 1% by weight or even less than 1% by weight.

The absorbent can contain 0.1% by weight to 30% by weight of the aliphatic amine compounds, a proportion of the aliphatic amine compounds of 0.1% by weight to 25% by weight being particularly advantageous. According to a preferred embodiment, the absorbent contains up to 10% by weight of the aliphatic amine compound, in particular up to 5% by weight of the aliphatic amine compound.

The percent by weight data of the physical scrubbing agent, water and the chemical scrubbing agent or the aliphatic amine compound contained in the absorbent always add up to 100% by weight.

In particular N-formylmorpholine (NFM) and/or N-acetylmorpholine (NAM) are suitable as a physical scrubbing agent for use in the absorbent. According to a preferred embodiment, the absorbent is composed mainly of a mixture of NFM and NAM.

It is within the scope of the invention that the amine compound has at least one component that is selected from the group of methyl diethanolamine (MDEA), diethanolamine (DEA), and polyethylene glycol substituted amine. It is advisable that the amine carries one and advantageously two polyethylene glycol substituents. It is also possible that the amine is provided with three polyethylene glycol substituents.

The invention is based on the discovery that acid gases are removed from a gas stream simply and reliably with the method according to the invention. It is essential to the invention that removal of the acid gases takes place up to the ppm range in a functionally reliable manner. It has been shown that the method according to the invention can be used for a plurality of gas streams with different acid-gas proportions and acid-gas compositions. Furthermore, synthesis gas, above all acid-converted synthesis gas, can be desulfurized in a surprisingly selective manner with the method according to the invention, such that a more selective and more cost-effective desulfurization is achieved compared to a purely physical solvent.

Furthermore, the invention is based on the discovery that the height of the absorption column or stripping column can be is clearly reduced by the method according to the invention compared to the methods known from practice. Furthermore, the method according to the invention manages with an unexpectedly low circulating amount of solvent, in particular in the selective desulfurization of synthesis gases after an acid conversion. It has been shown that the partial pressure differences for the physical absorption of the acid gases or the acid gas components in the absorbent according to the invention are favorably influenced by the addition of the amine compound. In this manner in particular hard-to-remove sulfur compounds can be reliably absorbed from the gas stream. It should be pointed out that the low water content ensures that corrosion is reliably avoided in installations in which the method according to the invention is carried out.

The invention claimed is:

1. In a method of removing acid gases from a gas stream by absorbing the acid gases from the gas stream by at least one absorbent comprising a mixture of a physical scrubbing agent, a chemical scrubbing agent and water, the improvement wherein:

the absorbent contains more than 70% by weight of the physical scrubbing agent and approximately 1% by weight or even less than 1% by weight water, a morpholine derivative is used as the physical scrubbing agent, and the chemical scrubbing agent comprises a polyethylene glycol substituted amine that carries two or three polyethylene glycol substituents as at least one aliphatic amine compound.

2. The method according to claim 1, wherein the absorbent contains more than 80% by weight of the physical scrubbing agent.

3. The method according to claim 1 wherein less than 1% by weight water is contained in the absorbent.

4. The method according to claim 1 wherein the absorbent contains as the chemical scrubbing agent 0.1% by weight to 25% by weight of the polyethylene glycol substituted amine that carries two or three polyethylene glycol substituents as the at least one aliphatic amine compound.

5. The method according to claim 1 wherein at least N-formyl morpholine (NFM) and/or N-acetylmorpholine (NAM) are contained as a physical scrubbing agent in the absorbent.

6. The method according to claim 1 wherein the chemical scrubbing agent includes at least one additional aliphatic amine compound that is methyl diethanolamine (MDEA) or diethanolamine (DEA).

7. The method according to claim 1 wherein the absorbent is used for the selective desulfurization of an acid-converted synthesis gas.

8. The method according to claim 1, wherein the absorbent contains as the chemical scrubbing agent 0.1% by weight to 10% by weight of the polyethylene glycol substituted amine that carries two or three polyethylene glycol substituents as the at least one aliphatic amine compound.

9. The method according to claim 1, wherein the gas stream is a stream of natural or synthesis gas.

* * * * *

UNITED STATES PATENT AND TRADEMARK OFFICE
CERTIFICATE OF CORRECTION

PATENT NO. : 8,702,846 B2  Page 1 of 1
APPLICATION NO. : 12/994859
DATED : April 22, 2014
INVENTOR(S) : Johannes Menzel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 82 days.

Signed and Sealed this

Twenty-ninth Day of September, 2015

Michelle K. Lee
*Director of the United States Patent and Trademark Office*